United States Patent [19]

Paske et al.

[11] Patent Number: 4,829,176

[45] Date of Patent: May 9, 1989

[54] LOGGING APPARATUS AND METHOD

[75] Inventors: William C. Paske, Pearland; Richard F. Roesler, Houston, both of Tex.

[73] Assignee: NL Industries, Inc., New York, N.Y.

[21] Appl. No.: 872,949

[22] Filed: Jun. 11, 1986

[51] Int. Cl.$^4$ .............................................. G01V 5/12
[52] U.S. Cl. .................................. 250/254; 250/266; 250/264
[58] Field of Search ............... 250/254, 262, 264, 265, 250/266, 269

[56] References Cited

U.S. PATENT DOCUMENTS

| | | | |
|---|---|---|---|
| 4,492,865 | 1/1985 | Murphy et al. | 250/254 |
| 4,596,926 | 6/1986 | Coope | 250/265 |

*Primary Examiner*—Carolyn E. Fields

*Attorney, Agent, or Firm*—Browning, Bushman, Zamecki & Anderson

[57] ABSTRACT

A gamma radiation logging system utilizes a single fixed gamma ray source spaced from a plurality of detector means arranged in banks so that the readings of the detectors can be utilized individually and in combination to derive the formation density, mud density and borehole diameter. The subject invention is capable of making the above determinations in a while-drilling condition without requiring physical contact with the formation nor making assumptions regarding composition of the formation or requiring further information from secondary sources. Each detector generates an output signal proportional to the photons reaching the detector with the signals being used to determine formation density, mud density and borehole diameter individually and collectively.

14 Claims, 2 Drawing Sheets

U.S. Patent May 9, 1989 Sheet 1 of 2 4,829,176
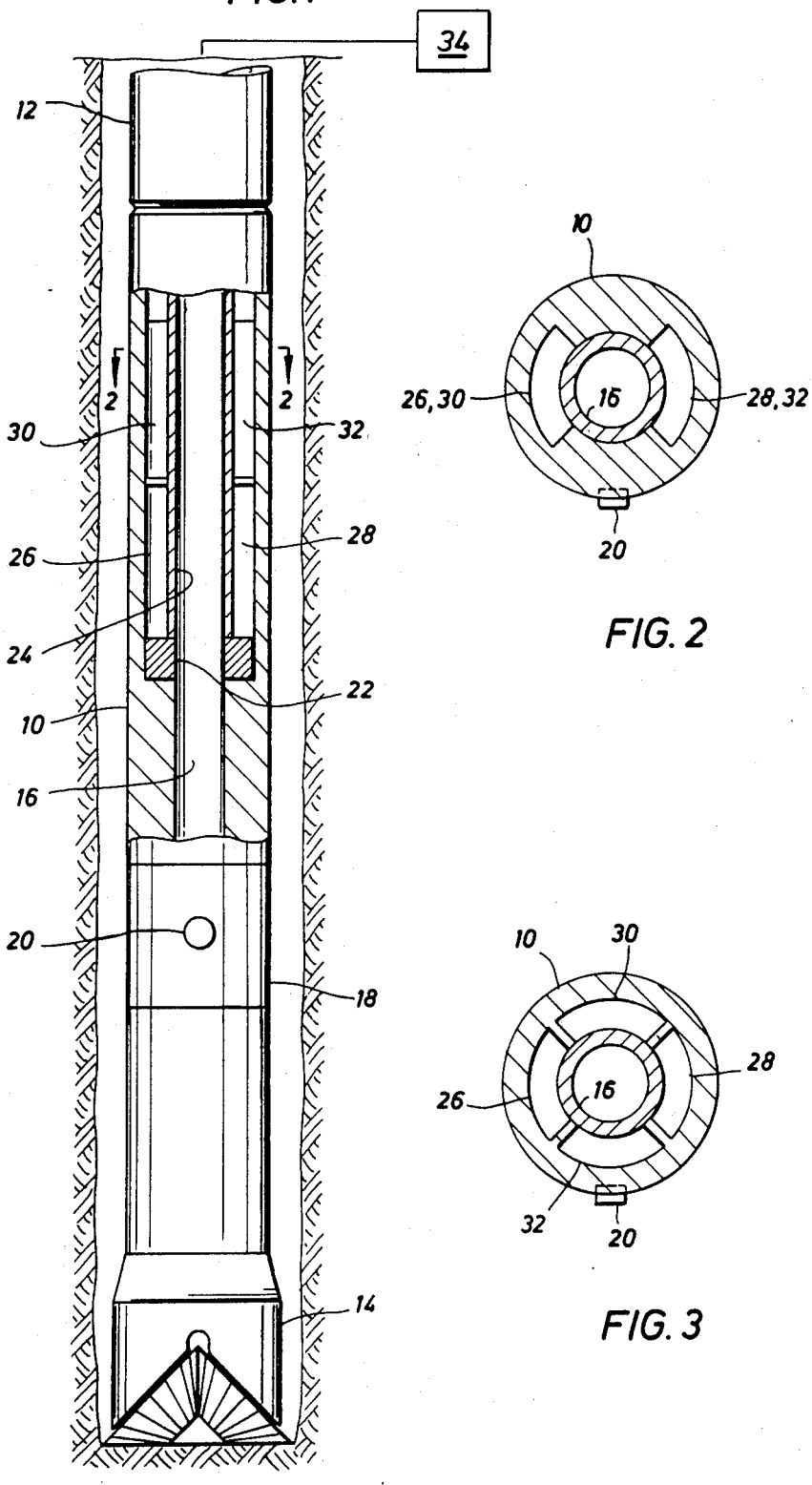
FIG. 1
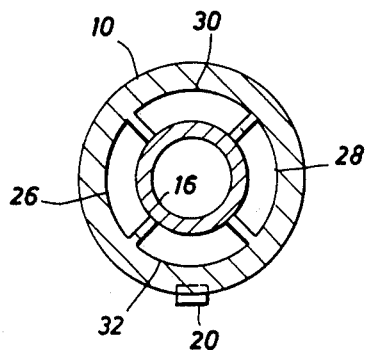
FIG. 2
FIG. 3

LOGGING APPARATUS AND METHOD

BACKGROUND OF THE INVENTION

1. Field of the Invention

The present invention relates to a method and apparatus for logging a borehole traversing an earth formation to determine the diameter of the borehole, the density of the surrounding formation and the density of the drilling mud, and in particular to a method and apparatus which will perform this logging while drilling the borehole through the formation. In particular, the inventive method and apparatus obviate the need for secondary caliber measuring devices and assumptions regarding the composition of the formation or information on the formation derived from secondary sources.

2. Description of the Prior Art

When drilling a borehole in the earth in search of petroleum, it is necessary to obtain as much information as possible regarding the nature and structure of the formations through which the borehole is passing. This information is necessary for the drilling operator to enable determining the progress of the drilling operation and to control its direction so as to intercept the pay zone. In the past, most of the necessary measurements have been made by pre-boring geological surveying techniques and then by wire line logging of the borehole after it has been drilled. This has a number of obvious disadvantages including loss of drilling time, the expense and delay involved in tripping the drill string so as to enable the wire line to be lowered into the borehole and both the build up of a substantial mud cake and invasion of the formation by the drilling fluids during the time period between drilling and taking measurements. An improvement over these prior art techniques is the recently developing art of measuring while drilling in which many of the characteristics of the formation are determined substantially contemporaneously with the drilling of the borehole. Measuring-while-drilling logging either partly or totally eliminates the necessity of interrupting the drilling operation to remove the drill string from the hole in order to make the necessary measurements by wire line techniques.

In addition to the ability to log the characteristics of the formation through which the drill bit is passing, this information on a real time basis provides substantial safety advantages for the drilling operation. For example, change in the density of the drilling fluid or the density of the formation or diameter of the borehole would indicate conditions which possibly would require immediate attention of the driller in order to prevent a blowout condition. For example, the decrease in the density of the drilling fluid might indicate influx of gas into the borehole from the surrounding formation. It would therefore be necessary to take prompt corrective action in order to prevent a blowout, for example by changing the density of the drilling fluid. With the previous wire line techniques, tripping of the drill string under these conditions could greatly increase the chances of a blowout occurring.

As mentioned above, one of the more important pieces of information to ascertain downhole is the density of the formation through which the borehole is passing. A known technique incorporates the use of gamma ray density probes which are devices generally incorporating a gamma ray source and at least one gamma ray detector which is shielded from the source and which during operation of the probe counts the gamma rays emanating from the source and interacting with the electrons of the material of the formation primarily by compton scattering. The photons eventually pass from the source to the detector after having undergone compton scattering through the formation. The photons reaching the detector are counted by standard associate counting equipment.

One of the major difficulties encountered by the previously known density or caliber measuring devices is the requirement that the device physically contact the formation at the borehole wall. This requirement was necessitated by the fact that all of the known devices were wire line devices and were employed hours or even days after drilling. During this delay, the drilling fluids can both invade the formation and build up a substantial thickness of either one which would directly affect the accuracy of measurements taken. It would not be possible to trip a drill string and lower a wire line device fast enough to avoid invasion and/or mudcake problems. These problems are not as severe in a measuring-while-drilling situation since there most likely is no significant amount of mud cake deposited on the borehole walls in a drilling situation, and measurements would generally be taken within an hour of drilling through a location to be measured. Some of the attempts to compensate for the mud cake problem have included the use of two different detectors spaced axially along the drill string with the near detector receiving radiation which is scattered mainly from the mud cake and the further spaced detector receiving radiation which has scattered principally from the formation. These are usually used in combination with a complex collimation scheme to narrowly define either beam and direct it into a specific region of the formation and to receive only that radiation coming from a particular region of the formation.

An example of a prior art wire line density probe which is claimed to function regardless of the thickness and the chemical composition of the materials that are located between the density probe and the samples is U.S. Pat. No. 3,846,631. The disclosed technique comprises passing two gamma ray beams from two intermittently operated sources into the sample, receiving the radiation back scattered from each of the two sources by two separate detectors, and building ratios of products of the four separate counting rates in such a manner that the numerical result is an indication of the density of the sample. The two detector probes must be deployed against the borehole wall, as previously discussed, adn the spacing between the detectors is a critical dimension. Any non-uniformity of the formation materials between the detectors will cause an erroneous result.

There are currently no known patented gamma radiation density detecting devices which operate in a measuring-while-drilling condition.

It would be very advantageous to overcome the limitations and inaccuracies of the prior art by having a system including a method and apparatus for measuring the density of formations while drilling a borehole through the formations without the necessity of defining narrow bands of the formation, performing collimation of the radiation, or physically contacting the borehole walls.

SUMMARY OF THE INVENTION

The present invention relates to a system including a method and apparatus for measuring formation density by means of a back scattered gamma radiation in a logging-while-drilling configuration. the subject apparatus is adapted for use in a drill string and includes a single source for emitting gamma radiation into the formation and preferably at least two pairs of detector means for counting emitted gamma radiation scattered in the formation back to the apparatus. The detectors provide individual counts which can be combined mathematically to produce an output signal proportional to the formation density. In one embodiment the detectors are mounted in pairs extending longitudinally along the drill string from and symmetrical with respect to the source. In another embodiment, the detectors are disposed about the circumference of the drill string at equal distance from the source with one pair of detectors being symmetrical to the source and the other pair being asymmetrical with respect to the source. In yet another embodiment, the detectors are disposed about the circumference of the drill string at equal distance from the source, which is on a diameter, with one of each pair of detectors lying to either side of the source diameter.

BRIEF DESCRIPTION OF THE DRAWINGS

The present invention will now be described with reference to the accompanying drawings in which:

FIG. 1 is a schematic side elevation, partly in section, of a lower end of a drill string incorporating the present invention;

FIG. 2 is a diagrammatic transverse section through a first embodiment of the present invention;

FIG. 3 is a diagrammatic transverse section through a second embodiment of the present invention;

DETAILED DESCRIPTION OF THE PREFERRED EMBODIMENT

Figure 4:
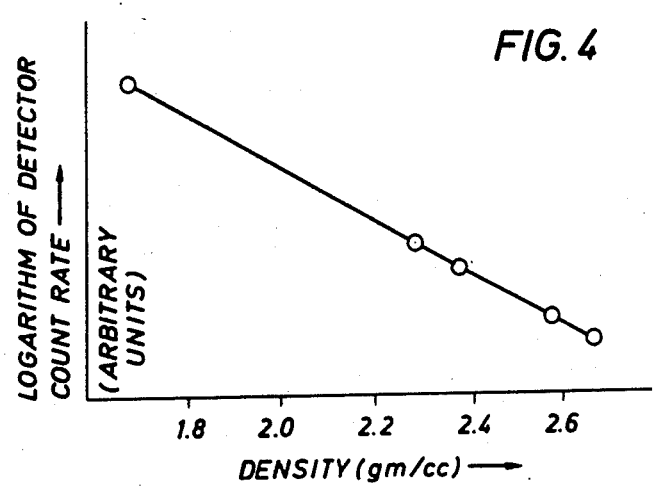
FIG. 4 is an illustrative graph showing a calibration curve for the detector according to the present invention.

An example of the present invention is shown in FIG. 1 as it would be installed in an equipment sub 10 at the lower end of a drill string 12 and immediately adjacent the drill bit 14. The sub has a through bore 16 and may be provided with a belt or band 18 containing a source 20 in the wall of the sub. Other structural arrangements could be used for source mounting. An annular shield 22 and adjacent cylindrical shield 24 are mounted in the sub spaced above the source 20 to isolate detectors 26, 28, 30, 32 from radiation passing up the bore 16. The shields are formed of appropriate gamma ray shielding material, such as tungsten.

It should be noted here that the source of gamma radiation 20 may be any conventional source such as Cesium 137 and that the detecting devices, while shown schematically as blocks, can be any conventional means such as Geiger-Mueller or scintillation detectors. It will, of course, be necessary to select the size of the source and the spacing to the detectors in accordance with the desired degree of accuracy of the resulting readings.

FIGS. 2 and 3 are diagrammatic transverse sections illustrating two alternate arrangements of the detectors.

In FIG. 2 the detectors are stacked one above the other as in FIG. 1 and are symmetrically disposed with respect to the source 20. In FIG. 3 the detectors are arranged completely around the circumference of the sub with detectors 26 and 28 being symmetric with respect to the source 20 and detectors 30, 32 being asymmetric. A further embodiment (not illustrated) would have source 20 on one diameter with detectors 26, 30 to one side of the diameter and detectors 28, 32 to the other side, all detectors being spaced about the circumference of the sub equal distance from the source.

It should here be noted that while only four detectors are shown, these are schematic representations and each detector could be formed by a combination of detectors.

By utilizing at least two pairs of detectors, it is possible to provide three measurements, for example a first measurement combining the outputs of detectors 26, 28, a second measurement combining the outputs of detectors 30, 32, and a third measurement combining the outputs of detectors 26, 30 and 28, 32. It is thus possible to derive the following equations which utilize the combined outputs of the detectors:

$$\rho_{ma}' = [e^{k_1 k'}(\rho_{30}-\rho_m)(\rho_{32}-\rho_m)]^{\frac{1}{2}} \rho_m \quad (1)$$

$$\rho_{ma}' = [e^{k_2 k'}(\rho_{26}-\rho_m)(\rho_{28}-\rho_m)]^{\frac{1}{2}} \rho_m \quad (2)$$

$$\rho_{ma}' = [e^{k_3 k'}(\rho_{26+30}-\rho_m)(\rho_{28+32}-\rho_m)]^{\frac{1}{2}} \rho_m \quad (1)$$

Bulk density, $\rho_{ma}'$, constant $k'$ and mud density $\rho_m$ are common to all three equations.

$k_1$, $k_2$, $k_3$ are geometric constants determined during calibration.

Bulk density is generally determined as $$\rho_m' = (1-\phi)\rho_{ma} \phi \rho_f$$

where $\rho_{ma}$ is formation matrix density and $\rho_f$ is fluid density.

Constant $k' = BH - TD$, borehole diameter less tool diameter.

Simultaneous solution of the above equations 1 to 3 will provide values for $\rho_{ma}'$, $k'$ and $\rho_m$ without making any assumptions as to their value. This provides the matrix bulk density $\rho_{ma}'$, and mud density can be used to monitor mud weight as a function of the drilling parameters and influx. The borehole diameter BH can be determined from $k' = BH - TD$ independent of assumptions as to the matrix type or porosity.

In order to accomplish these functions, it is necessary to have four output signals, one from each of the detectors. There also must be two independent banks or groups of detectors available. Means are provided, shown generally at 34, to respond to the output signals and perform the calculations for the unknown parameters. Such means may be of conventional design, and are therefore not described in detail.

Figure 5:
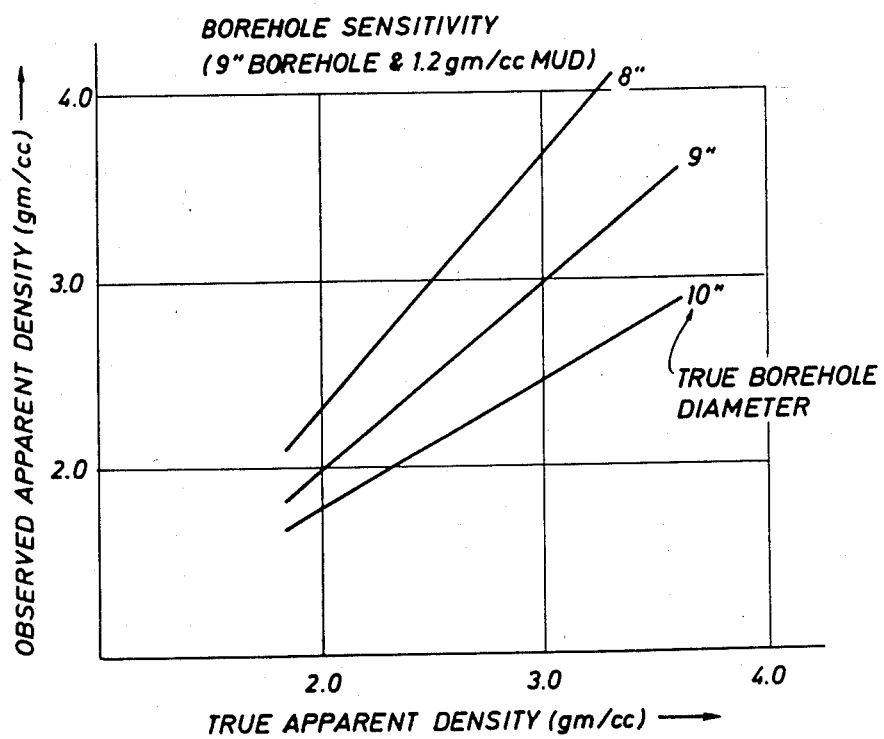
FIG. 5 is a plot of formation density for different borehole sizes.

FIG. 4 is prepared to convert the logarithm of the detector count rate (in any arbitrary units) to a density indication with the tool surface at a given distance from the surface of the formation.

the borehole diameter can be determined from the density, as noted in FIG. 5, or by simultaneously solving the above equations 1 to 3.

The foregoing disclosure and description of the present invention is illustrative and explanatory thereof, and various changes in the method steps as well as in the details of the illustrated apparatus may be made within the scope of the appended claims without departing from the spirit of the invention.

What is claimed is:

1. A gamma radiation logging apparatus for use in a borehole traversing an earth formation to determine the diameter of said borehole, density of the formation, and density of the drilling fluid, comprising:
   an elongated sonde having a longitudinal axis;
   a source of gamma radiation mounted in said sonde at a first location;
   gamma radiation detection means mounted in said sonde at a second location spaced from said first location, said detection means having at least first and second parts symmetrically disposed with respect to each other, each part producing an output signal proportional to the number of photons reaching the part; and
   means responsive to the otuput signals of said first and second parts of said detection means individually and in combination for determining the formation density, mud density and borehole diameter.

2. A gamma radiation logging apparatus according to claim 1 wherein said first and second parts of said detection means are each symmetrically disposed about the longitudinal axis of said sonde and spaced sequentially in the longitudinal direction from said source.

3. A gamma radiation logging apparatus according to claim 2 wherein each said first and said second parts of said detection means comprises at least a pair of detectors.

4. A gamma radiation logging apparatus according to claim 1 wherein said first and second parts of said detection means are pairs of detectors spaced about the periphery of said sonde, at least one pair being symmetrically disposed with respect to said source.

5. A gamma radiation logging apparatus according to claim 1 wherein said first and second parts of said detection means are pairs of detectors spaced about the periphery of said sonde, one of each said pairs lying to either side of a diameter passing through said source.

6. A system for gamma radiation logging of a borehole traversing an earth formation to determine the diameter of said borehole, density of the formation, and density of the drilling mud comprising:
   an elongate housing connected in a drill string;
   a source of gamma radiation fixedly mounted in said housing;
   gamma radiation detection means mounted in said housing spaced from said source and comprising at least first and second pairs of detector means, each generating an output signal proportional to the number of photons reaching said detector means; and
   means responsive to the output signals from said detector means individually and in combination for determining the formation density, mud density and borehole diameter.

7. A system for gamma radiation logging according to claim 6 wherein said first and second pairs of detector means are each symmetrically disposed about the longitudinal axis of said housing with respect to said source and spaced sequentially in the longitudinal direction from said source.

8. A system for gamma radiation logging according to claim 6 wherein said detector means are located longitudinally in said housing the same distance from said source, at least one pair of said detector means being symmetrically disposed with respect to said source.

9. A system for gamma radiation logging according to claim 6 wherein said detector means are located longitudinally in said housing the same distance from said source with one of each pair lying on each side of a diameter running through said source.

10. A method for gamma radiation logging of a borehole traversing an earth formation during drilling to determine the diameter of said borehole, density of the formation and density of the drilling fluid comprising the steps of:
    positioning an elongated logging housing closely adjacent a drill bit on the free end of a drill string in a borehole, said housing containing a gamma radiation source and a plurality of detectors spaced therefrom;
    emitting gamma radiation from said source into said formation;
    detecting at each detector photons after Compton scattering through the formation and generating an output from each detector proportional to the number of photons reaching said detector; and
    utilizing the outputs from said detectors individually and in combination to determine the formation density, mud density and borehole diameter.

11. A method according to claim 10 wherein said outputs from said detectors are used to solve three simultaneous equations to determine said formation density, mud density and borehole diameter.

12. A method according to claim 11 wherein bulk density, mud density and a constant determined by borehole diameter less tool diameter are common to all three equations.

13. A method according to claim 11 wherein each equation contains a geometric constant determined during calibration.

14. A method according to claim 11 wherein said equations are solved independently of assumptios as to formation matrix type and porosity.

* * * * *